(12) United States Patent
Greenwood et al.

(10) Patent No.: US 8,270,167 B2
(45) Date of Patent: Sep. 18, 2012

(54) HEAT TRANSFER APPARATUS FOR USE WITH ELECTRICAL DEVICES

(75) Inventors: Peter James Greenwood, Cheshire, CT (US); Javier Ignacio Larranaga, Bristol, CT (US)

(73) Assignee: General Electric Company, Schenectady, NY (US)

( * ) Notice: Subject to any disclaimer, the term of this patent is extended or adjusted under 35 U.S.C. 154(b) by 64 days.

(21) Appl. No.: 12/908,961

(22) Filed: Oct. 21, 2010

(65) Prior Publication Data
US 2012/0099279 A1    Apr. 26, 2012

(51) Int. Cl.
*H05K 7/20* (2006.01)
(52) U.S. Cl. ... 361/704; 361/637; 361/641; 361/679.54; 165/104.33; 165/185
(58) Field of Classification Search .......... 361/600–608, 361/622, 625, 627–632, 634–638, 641–648, 361/652, 656, 653, 673, 679.46, 679.53, 361/704, 714; 165/104.33, 185; 174/166 R, 174/70 B, 68.2, 88 B, 129 B, 133 B, 171, 174/66–68; 439/723, 724, 82, 83, 79, 115, 439/884, 116, 209, 101, 102; 200/1 R, 307, 200/330; 29/592, 883
See application file for complete search history.

(56) References Cited

U.S. PATENT DOCUMENTS

| | | | |
|---|---|---|---|
| 2,738,445 A * | 3/1956 | Hammerly et al. | 361/650 |
| 3,204,150 A * | 8/1965 | Gauthier | 361/673 |
| 4,142,225 A * | 2/1979 | Diersing et al. | 361/647 |
| 4,153,318 A * | 5/1979 | Bishop et al. | 439/121 |
| 4,251,851 A * | 2/1981 | Diersing et al. | 361/652 |
| 4,301,493 A * | 11/1981 | Schweikle et al. | 361/640 |
| 4,307,370 A | 12/1981 | Hollweck | |
| 4,449,296 A * | 5/1984 | Luke et al. | 29/883 |
| 4,912,598 A * | 3/1990 | Grass | 361/652 |
| 5,166,861 A * | 11/1992 | Krom | 361/678 |
| 5,172,300 A * | 12/1992 | Morby et al. | 361/637 |
| 5,315,477 A * | 5/1994 | Schumacher et al. | 361/678 |
| 5,640,294 A * | 6/1997 | Caggiano et al. | 361/637 |
| 6,822,018 B2 | 11/2004 | Chaudhuri et al. | |
| 6,873,043 B2 | 3/2005 | Oman | |
| 7,372,692 B2 * | 5/2008 | Ranta et al. | 361/641 |
| 7,505,272 B2 | 3/2009 | Gilliland | |
| 7,561,436 B2 | 7/2009 | Brandenburg et al. | |

* cited by examiner

*Primary Examiner* — Michail V Datskovskiy
(74) *Attorney, Agent, or Firm* — Global Patent Operation (57) ABSTRACT

An electrical device includes an enclosure having an interior surface, at least one bus bar, and an element enclosing at least a portion of the bus bar, wherein the element includes a first surface contacting the interior surface and is configured to transfer heat from the bus bar to the enclosure and configured to provide electrical isolation between the enclosure and the bus bar.

17 Claims, 9 Drawing Sheets

HEAT TRANSFER APPARATUS FOR USE WITH ELECTRICAL DEVICES

BACKGROUND OF THE INVENTION

The embodiments described herein relate generally to electrical equipment and, more particularly, to heat transfer from an electrical component to an enclosure.

Electrical distribution equipment and components are generally required to operate within a temperature range established by safety organizations as an industry standard. For example, one such standard provides an upper temperature rise limit for electrical equipment panels, such as circuit breaker panels. At least some known electrical panels include conductive materials in a current path to provide heat transfer away from vulnerable components. However, copper, for example, has become expensive. Moreover, these conductive materials can introduce a feedback component, wherein heat generated by one component is transferred away from that component using another heat generating component. Furthermore, these conductive materials generally cannot be placed directly into electrical contact with an enclosure because of the risk of shock to a user. Furthermore, additional insulative material is required between these conductive materials to prevent current from being conducted between phase conductors or to an enclosure. For example, a copper conductor cannot generally be positioned in contact with the enclosure of known equipment panels because current carried by the copper conductor can be transferred to a user that contacts the enclosure door.

BRIEF DESCRIPTION OF THE INVENTION

In one aspect, an electrical device includes an enclosure having an interior surface, at least one bus bar, and an element enclosing at least a portion of the bus bar. The element includes a first surface contacting the interior surface and is configured to transfer heat from the bus bar to the enclosure and to provide electrical isolation between the enclosure and the bus bar.

In another aspect, a circuit breaker assembly is provided for use with an electrical panel enclosure. The circuit breaker assembly includes at least one bus bar, a circuit breaker coupled to the bus bar, and an element enclosing at least a portion of the bus bar. The element includes a first surface and a second surface, wherein the first surface contacts the electrical panel enclosure and the circuit breaker is positioned along at least a portion of the second surface. The element is configured to transfer heat from at least one of the bus bar and the circuit breaker to the electrical panel enclosure and to provide electrical isolation between the electrical panel enclosure and the bus bar.

In another aspect, a method is provided for assembling a circuit breaker assembly for use within an electrical panel enclosure, wherein the circuit breaker assembly includes a circuit breaker configured to be connected to a conductor. The method includes connecting at least one bus bar to the conductor, positioning an element to enclose at least a portion of the bus bar such that a first surface of the element is positioned in contact with the electrical panel enclosure to facilitate transferring heat from the at least one bus bar to the electrical panel enclosure and to facilitate providing electrical isolation between the electrical panel enclosure and the at least one bus bar. The method also includes coupling the circuit breaker to the at least one bus bar along at least a portion of a second surface of the element.

DETAILED DESCRIPTION OF THE INVENTION

Exemplary embodiments of systems and apparatus for use in dissipating heat from an electrical device are described hereinabove. These embodiments facilitate using a thermal conductive and electrical isolating element or material as a heat sink to absorb heat from a current path and to transfer that heat to ambient air through the surface of an enclosure. Use of this element as a heat sink enables performance enhancements and reduces an amount of copper, for example, that is used to assemble an electrical device. For example, the element enables heat transfer out of the interior of the electrical device and into the ambient to lower the internal operating temperature of the electrical components within the electrical device, such as circuit breakers and the like. Moreover, the element provides electrical isolation between current-carrying components in the electrical device, such as bus bars, and the enclosure to protect users from shock and/or to protect against short circuit events between a phase and ground or between phases.

Figure 1:
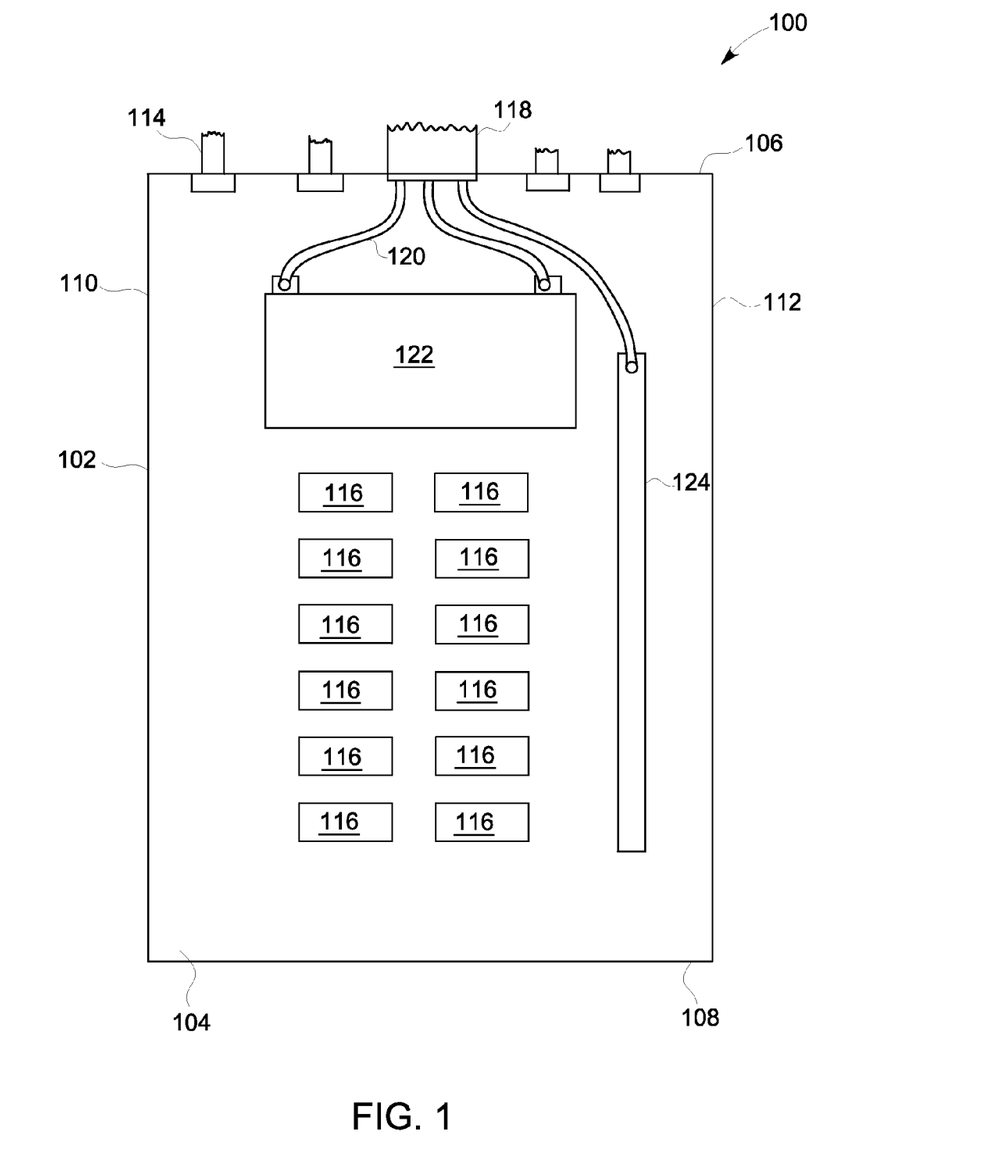
FIG. 1 is a schematic block diagram of an exemplary electrical panel.

FIG. 1 is a schematic block diagram of an exemplary electrical panel 100 for use in a residential and/or commercial space. Electrical panel 100 includes an enclosure 102 having a rear wall 104, a top wall 106, and an opposite bottom wall 108. Moreover, enclosure 102 includes a first sidewall 110 and an opposite second sidewall 112. Top wall 106, bottom wall 108, first sidewall 110, and second sidewall 112 are all coupled to rear wall 104. Enclosure 102 also includes a dead front and a cover or door (not shown) that is coupled, such as by a hinge, to enable access to electrical panel 100 for service and/or installation.

Electrical panel 100 also includes a plurality of conduits or cables 114 that extend through top wall 106 into enclosure 102. Conduits 114 route circuit conductors (not shown) from an outside space into electrical panel 100, where each circuit conductor is electrically connected to a respective circuit breaker assembly 116. Moreover, a main conduit 118 routes power conductors 120 into electrical panel 100. Power conductors 120 are electrically connected to a main circuit breaker or main lug 122 and/or a neutral bus bar 124. In the exemplary embodiment, each circuit breaker assembly 116 is also electrically connected to main breaker 122 and/or neutral bus bar 124 to obtain power and/or control signals. Moreover, each circuit breaker assembly 116 monitors a respective circuit conductor for a fault, such as an overcurrent fault. Once a fault is detected in a circuit conductor, circuit breaker assembly 116 interrupts the circuit. For example, mechanically-stored energy, such as a spring, is used to separate the contacts.

Figure 2:
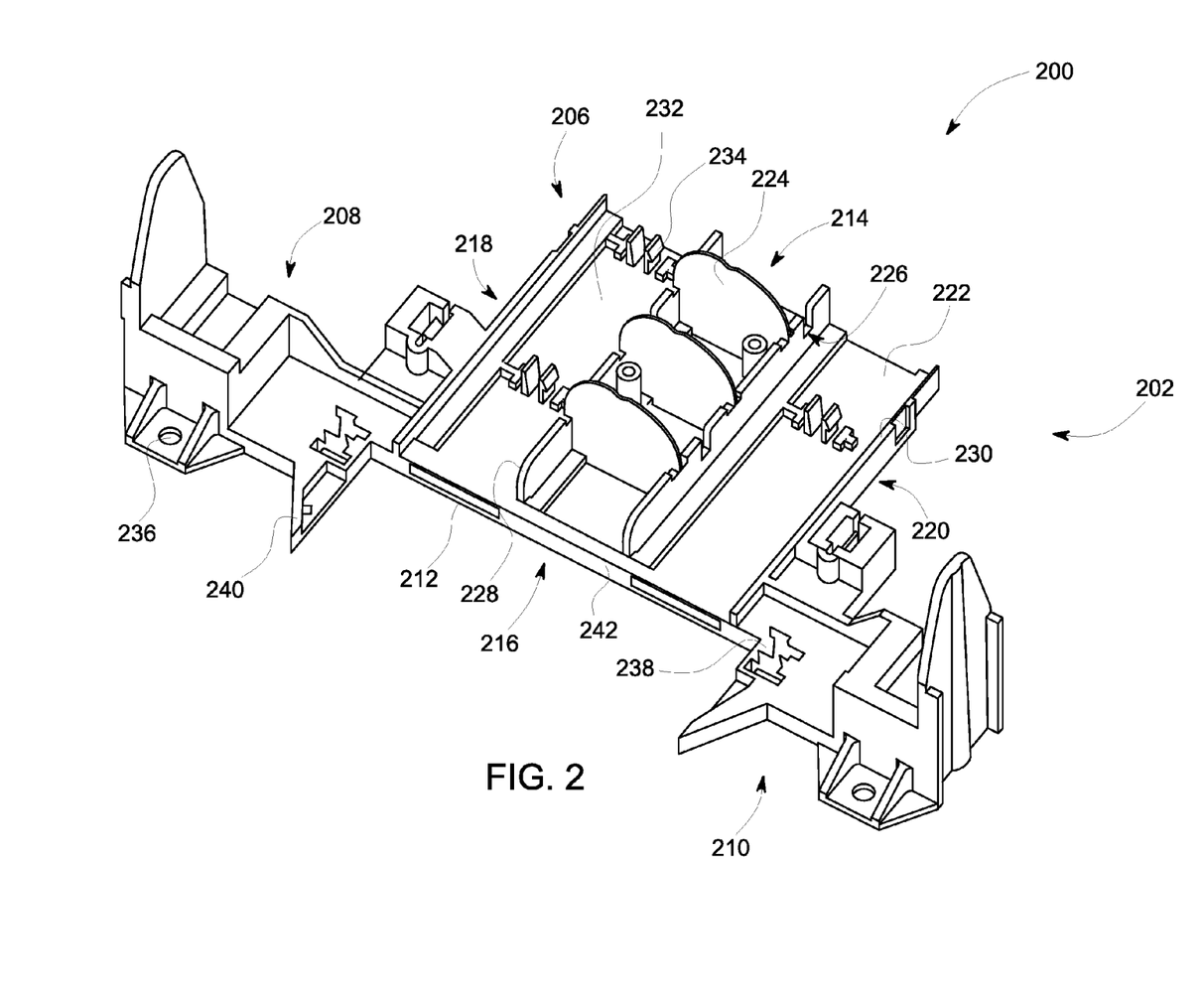
FIG. 2 is a perspective view of a first portion of an exemplary insulating portion that may be used in the electrical panel shown in FIG. 1.
Figure 3:
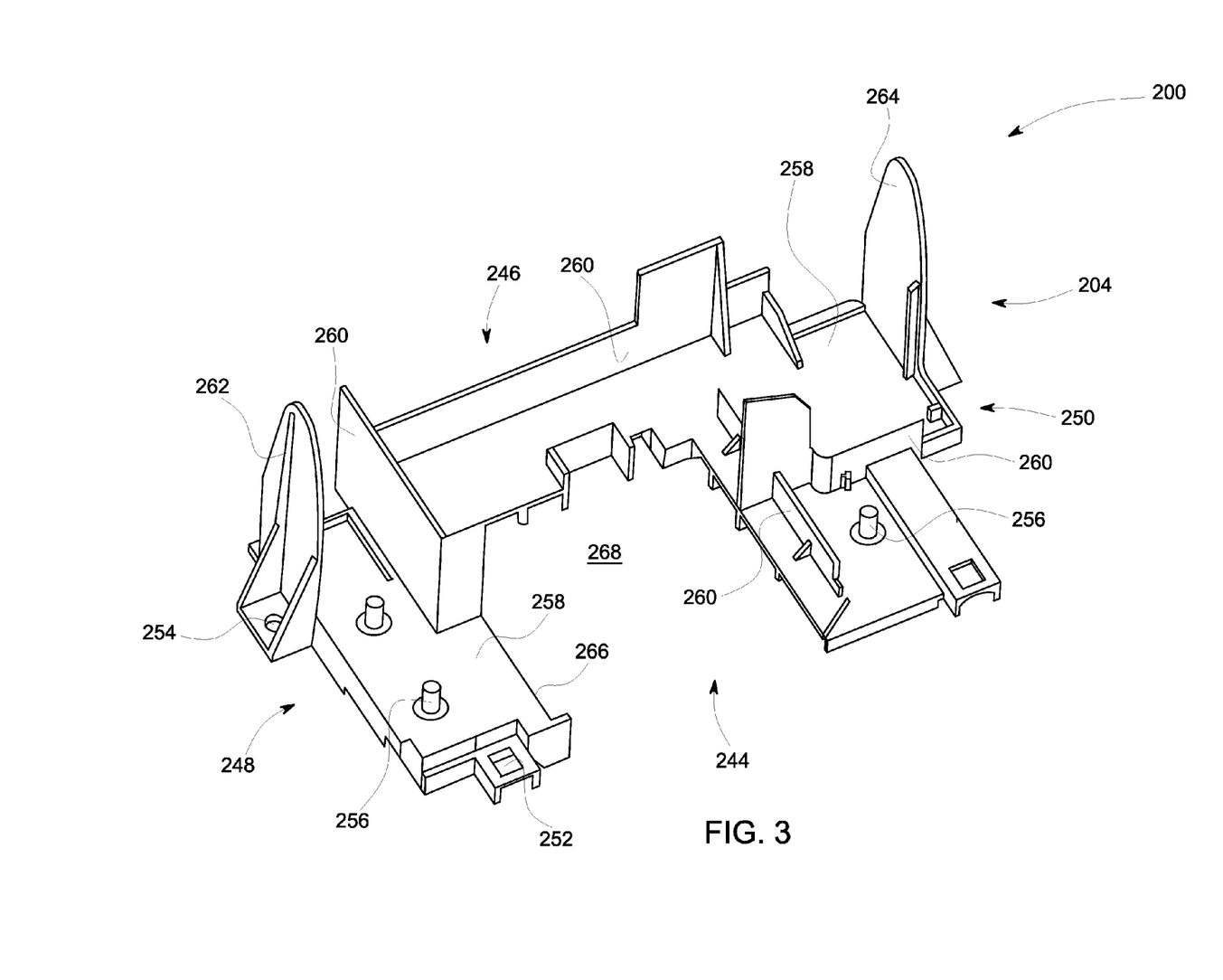
FIG. 3 is a perspective view of a second insulating portion that may be used with the electrical panel shown in Fig.

FIGS. 2 and 3 are perspective views of exemplary insulating portions that may be used with electrical panel 100 (shown in FIG. 1) to provide electrical isolation between a circuit breaker, lug, and/or bus bar (neither shown in FIGS. 2 and 3) and enclosure 102 (shown in FIG. 1). More specifically, FIG. 2 is a perspective view of a first isolating portion 202 and FIG. 3 is a perspective view of a second isolating portion 204. In the exemplary embodiment, first insulating portion 202 and/or second insulating portion 204 is molded from a plastic to provide electrical isolation between various electrical components and/or between adjacent circuit breaker assemblies 116. However, first insulating portion 202 and/or second insulating portion 204 may be made from any suitable material that enables electrical isolation between the components described herein. In the exemplary embodiment, electrical panel 100 includes at least one circuit breaker (not shown) that couples to first insulating portion 202 and to bus bars (not shown) that are coupled to second insulating portion 204. More specifically, first insulating portion 202 and/or second insulating portion 204 provide electrical isolation between the circuit breaker and enclosure 102. In an alternative embodiment, a lug (not shown) is included in electrical panel 100 rather than a circuit breaker. In such an embodiment, the lug is coupled to first insulating portion 202 to facilitate providing electrical isolation between the lug and enclosure 102. Moreover, in such an embodiment, electrical panel 100 does not include second insulating portion 204.

In the exemplary embodiment, and referring to FIG. 2, first insulating portion 202 includes a body portion 206, a first leg portion 208, and a second leg portion 210. A bottom surface 212 of first insulating portion 202 is positioned in contact with an inner surface of enclosure 102. Specifically, bottom surface 212 is positioned in contact with the inner surface of rear wall 104 (shown in FIG. 1). Body portion 206 includes a first end 214, an opposite second end 216, a first side 218, and an opposite second side 220. Moreover, body portion 206 includes a top surface 222. In addition, a plurality of isolating fins 224 are spaced apart along top surface 222 to provide electrical isolation between projections of a plurality of bus bars (not shown). The projections are secured between fins 224 within respective slots 226. Specifically, slots 226 are formed in inner walls 228 of body portion 206, and fins 224 extend between inner walls 228. Body portion 206 also includes outer walls 230 at each side 218 and 220. Bus bar channels 232 are defined between respective inner and outer walls 228 and 230 to secure the bus bars therein. A plurality of fastening mechanisms 234, such as clips or prongs, are positioned along top surface 222 to secure the bus bars.

Moreover, first leg portion 208 and second leg portion 210 each includes a mounting aperture 236 sized to receive a screw or bolt (not shown) therethrough to secure first insulating portion 202 to rear wall 104. First and second leg portions 208 and 210 also include one or more fastening mechanisms 238 to facilitate coupling second insulating portion 204 to first insulating portion 202. In addition, each leg portion 208 and 210 includes an extension 240. Body portion second end 216 and extensions 240 define an inner edge 242 of first insulating portion 202.

In the exemplary embodiment, and referring now to FIG. 3, second insulating portion 204 includes a first end 244 and an opposite second end 246, as well as a first side 248 and an opposite second side 250. A plurality of openings 252 extend through second insulating portion 204 at first end 244. Each opening 252 is sized to receive a fastening mechanism 234 (shown in FIG. 2) therethrough to facilitate coupling second insulating portion 204 to first insulating portion 202. In addition, a plurality of mounting apertures 254 extends through second insulating portion 204. Each mounting aperture 254 is sized to receive a screw or bolt (not shown) therethrough to secure second insulating portion 204 to rear wall 104. A plurality of posts 256 extend upward from a top surface 258 to facilitate coupling a plurality of bus bars (not shown) to second insulating portion 204. In addition, a plurality of inner walls 260 are positioned along top surface 258 of second insulating portion 204 to provide electrical isolation between the bus bars. A first projection 262 extends upward from top surface 258 at first side 248, and a second projection 264 extends upward from top surface 258 at second side 250. Projections 262 and 264 secure a circuit breaker therebetween. Furthermore, an inner edge 266 of second insulating portion 204 is defined by first side 248, second side 250, and second end 246. An opening 268 is defined by inner edge 242 of first insulating portion 202 and inner edge 266 of second insulating portion 204.

In an alternative embodiment, electrical panel 100 includes a lug (not shown) rather than a circuit breaker. In such an embodiment, the lug is coupled to cables 114 (shown in FIG. 1) for power transfer to and from the lug. The lug is also coupled to neutral bus bar 124 and any other bus bars, such as a ground bus bar. Moreover, in such an embodiment, the lug is coupled to first insulating portion 202 to facilitate to provide electrical isolation between various electrical components and/or between the electrical components and enclosure 102. Furthermore, in such an embodiment, second insulating portion 204 is not included because electrical panel 100 includes fewer bus bars, which requires less electrical isolation.

Figure 4:
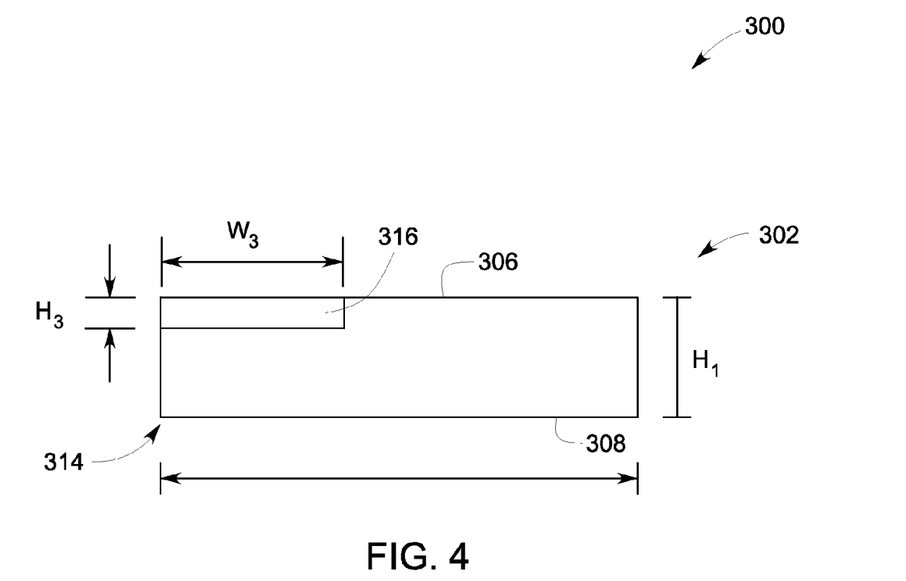
FIG. 4 is a side view of a first or bottom portion of an exemplary element that may be used in the electrical panel shown in FIG. 1.
Figure 5:
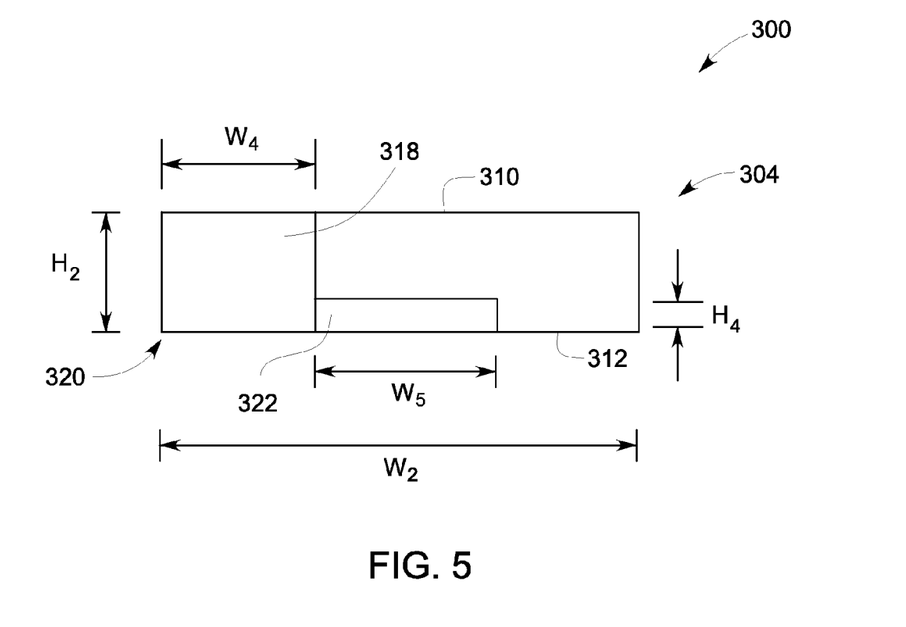
FIG. 5 is a side view of a second or top portion of the element shown in FIG. 4.

FIGS. 4 and 5 are side views of an exemplary thermally conductive and electrically isolating element 300 for use with circuit breaker assembly 116 (shown in FIG. 1) to provide heat transfer and electrical isolation between a circuit breaker and/or bus bar (neither shown in FIGS. 4 and 5) and enclosure 102 (shown in FIG. 1). More specifically, FIG. 4 is a side view of a first or bottom portion 302 of element 300, and FIG. 5 is a side view of a second or top portion 304 of element 300. In the exemplary embodiment, element 300 absorbs heat from a current path that includes, for example, a plurality of bus bars and a circuit breaker. Element 300 transfers the heat to enclosure 102 for dissipation into the ambient environment. Moreover, element 300 provides electrical isolation between the bus bars and/or circuit breaker, and enclosure 102 to protect users from shock and to enhance dielectric performance. In an alternative embodiment, element 300 is unitary, i.e., is formed of a single piece.

In the exemplary embodiment, element 300 is a thermally conductive plastic composed of an injection molding grade polymer. Moreover, element 300 is moldable to enable a unitary form. In the exemplary embodiment, element 300 is also electrically isolative and provides electromagnetic interference (EMI) and radio frequency interference (RFI) shielding. Exemplary materials that may be used as element 300 is CoolPoly® E5101 and CoolPoly® E3603, both commercially available from Cool Polymers® (CoolPoly® and Cool Polymers® are registered trademarks of Cool Options, Inc. of Warwick, R.I., USA). However, element 300 may be composed of any suitable material that provides sufficient heat transfer and electrical shielding, and that is moldable.

As shown in FIG. 4, bottom portion 302 includes a top surface 306 and an opposite bottom surface 308, which is a first surface, or bottom surface, of element 300. Bottom surface 308 is positioned in contact with an interior surface (not shown in FIGS. 4 and 5) of enclosure 102 (shown in FIG. 1) to facilitate transferring heat from a circuit breaker (not shown in FIGS. 4 and 5) to enclosure 102 and for providing electrical isolation between the circuit breaker and enclosure 102. Moreover, as shown in FIG. 5, top portion 304 includes a top surface 310 and an opposite bottom surface 312. Bottom surface 312 is positioned in contact with at least a portion of top surface 306. Top surface 310 is a second surface, or top surface, of element 300, and is positioned in contact with the circuit breaker to facilitate transferring heat generated by the circuit breaker to bottom portion 302. In the exemplary embodiment, top portion 304 includes a first height H1 and a first width W1. Similarly, bottom portion 302 has a second height H2 and a second width W2 that are approximately equal to first height H1 and first width W1. Alternatively, bottom portion 302 may have different dimensions than top portion 304. In the exemplary embodiment, first and second heights H1 and H2 measure approximately 0.368 inches and first and second widths W1 and W2 measure approximately 2.97 inches. However, it should be understood that first height H1, first width W1, second height H2, and/or second width W2 may be slightly bigger or slightly smaller than the above measurements.

In some embodiments, a thermal paste (not shown) is applied along one or more surfaces of element 300 to enhance heat transfer between top and bottom portions 304 and 302. The thermal paste can also enhance heat transfer between element 300, circuit breaker assembly 116, and enclosure 102. Specifically, the thermal paste facilitates additional surface contact between two adjacent surfaces to overcome irregularities of the surfaces. The term "thermal paste" refers to any suitable heat transferring agent that fills gaps that naturally occur when two flat surfaces, such as between element 300, circuit breaker assembly 116, and enclosure 102, are pressed against one another. These gaps hinder the rate of heat transfer from the hotter surface transfers heat energy to the cooler surface, and filling these gaps enhances heat transfer performance. Accordingly, the thermal paste may be any suitable thermal material, such as a ceramic-based paste, a metal-based paste, or a waxy thermal pad. These are exemplary only and are not meant to limit the definition of the term "thermal paste." Moreover, in some embodiments, a resilient surface coating is applied along one or more surfaces of element 300. For example, the coating may be applied to bottom surface 308 to facilitate enhanced heat transfer between bottom portion 302 and enclosure 102. Alternatively, or in addition, the coating may be applied to top surface 310 to facilitate enhanced heat transfer between top portion 304 and a circuit breaker, lug, or any suitable electronic device. The terms "surface coating" and "resilient surface coating" refer to a thermally conductive material, such as a plastic, that enhances thermal conductivity between two surfaces, such as between element 300, circuit breaker assembly 116, and enclosure 102. An exemplary material that may be used as the surface coating is CoolPoly® D8102 commercially available from Cool Polymers®. However, the surface coating may be composed of any suitable material that provides sufficient heat transfer between two adjacent surfaces.

Moreover, in some embodiments, top and bottom portions 304 and 302 are each formed to define a groove (not shown in FIGS. 4 and 5) therebetween, wherein the groove is sized to at least partially enclose a bus bar. To form the groove, an elongate first section 316 is removed from bottom portion 302 by, for example, a machining process, an etching process, or any other suitable material removal process. Specifically, first section 316 is removed from a first end 314 and at least a portion of top surface 306 of bottom portion 302. Similarly, a second section 318 is removed from a first end 320 of top portion 304. When top portion 304 and bottom portion 302 are positioned within circuit breaker assembly 116 (shown in FIG. 1), second section 318 provides clearance for mounting a circuit breaker. In addition, a third section 322 is removed from top portion 304 along at least a portion of bottom surface 312. The groove is defined by first section 316 and third section 322. Moreover, the groove extends at least partially into element 300 and is sized to receive at least a portion of a bus bar therein to transfer heat from the bus bar to enclosure 102.

In an alternative embodiment, element 300 is unitary. In such an embodiment, second section 318 is first removed from first end 314 and the groove is then formed in element 300 and sized to receive at least a portion of a bus bar therein. In another alternative embodiment, element 300 is unitary and is formed or shaped to include the groove without using any material removal process.

Figure 6:
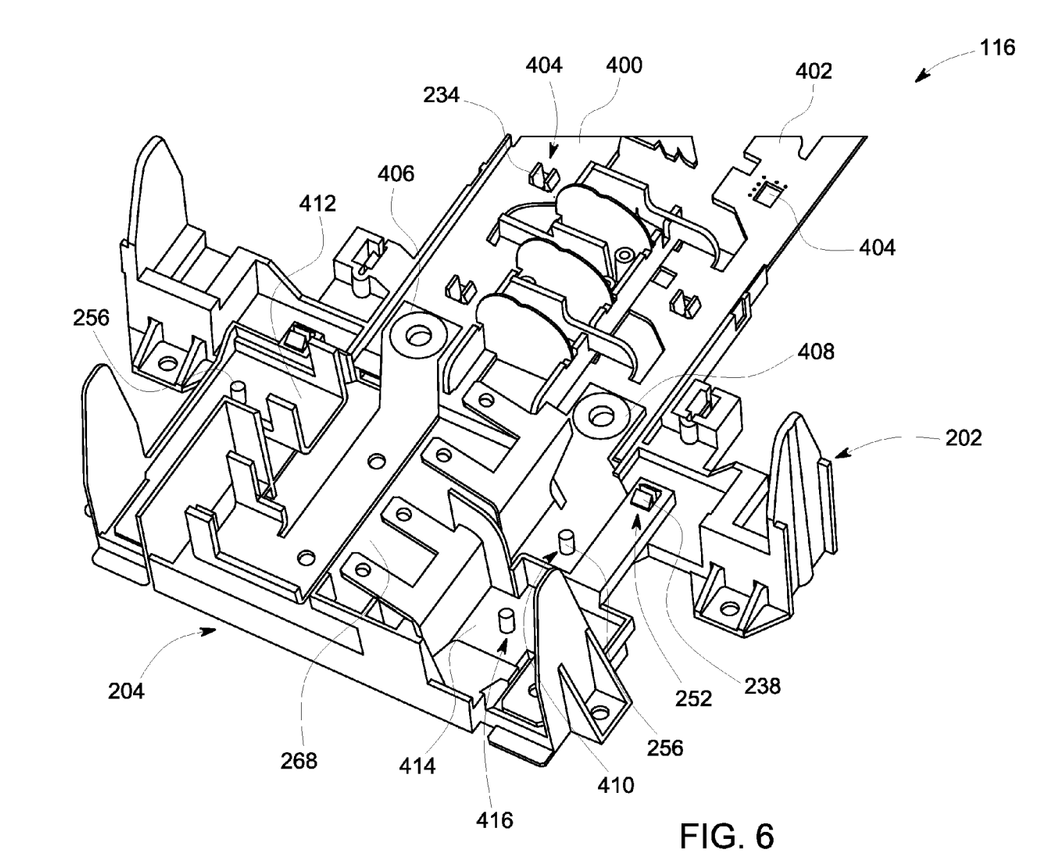
FIG. 6 is a perspective view of an exemplary circuit breaker assembly that may be used in the electrical pane shown in FIG. 1.
Figure 7:
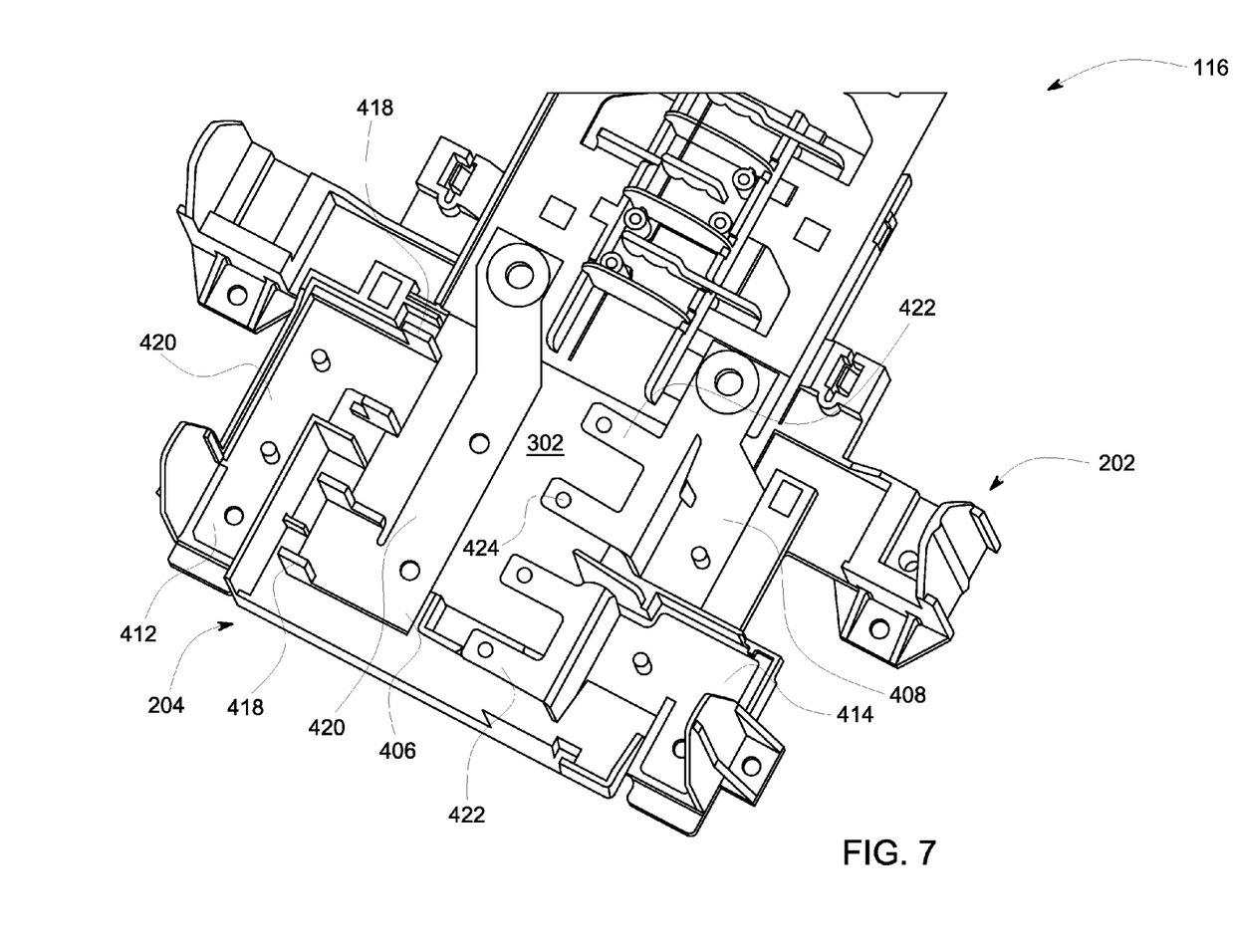
FIG. 7 is another perspective view of the circuit breaker assembly shown in FIG. 6.
Figure 8:
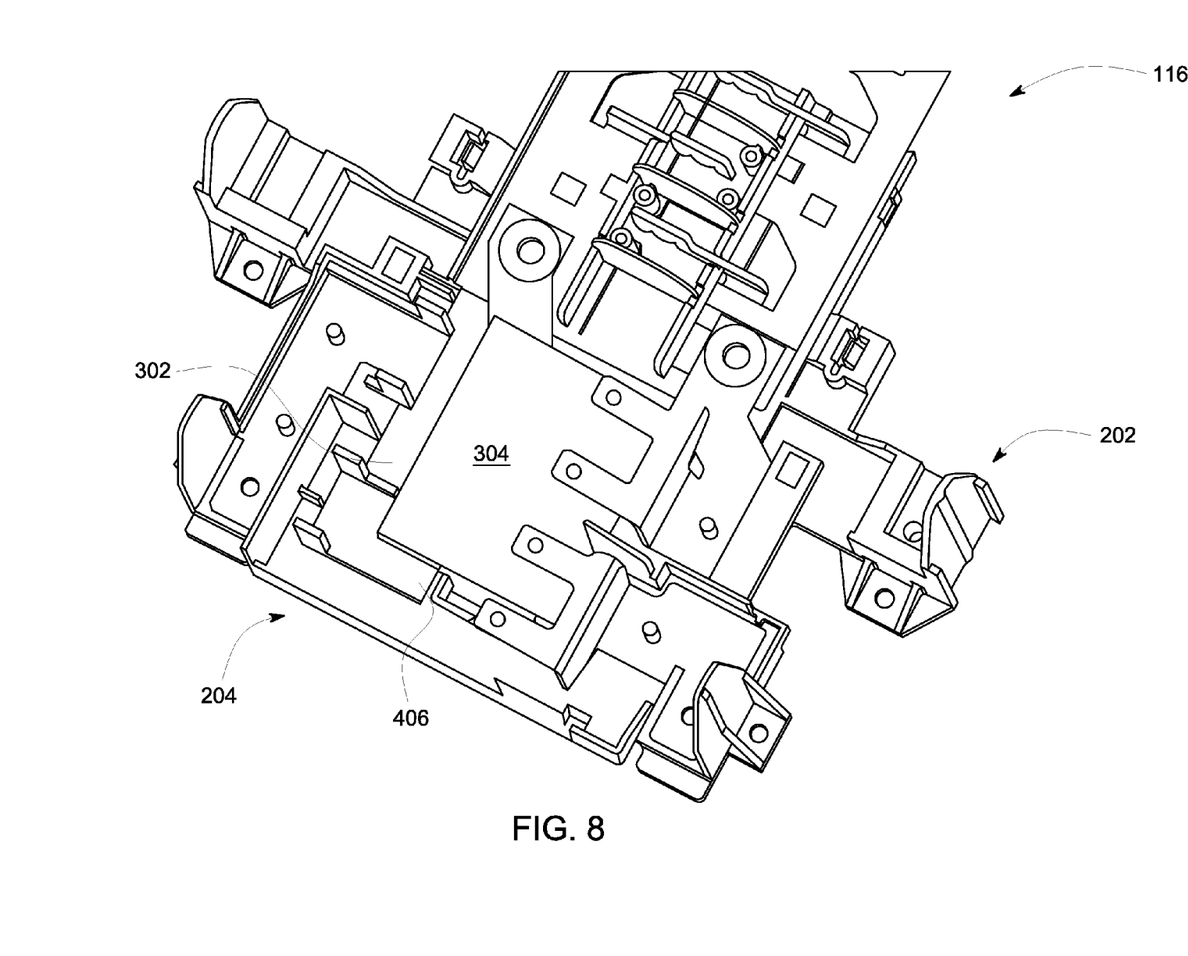
FIG. 8 is another perspective view of the circuit breaker shown in FIG. 6.

FIGS. 6-8 are perspective views of circuit breaker assembly 116 in phases of assembly. As shown in FIG. 6, first insulating portion 202 and second insulating portion 204 are coupled by inserting fastening mechanisms 234 through openings 252. Moreover, a plurality of bus bars is coupled to first insulating portion 202 and/or second insulating portion 204. In the exemplary embodiment, the bus bars are copper. Alternatively, the bus bars may be composed of any other suitably conductive material. In the exemplary embodiment, a first bus bar 400 and a second bus bar 402 are coupled to first insulating portion 202. First and second bus bars 400 and 402 are also coupled to main breaker or lug 122 and/or neutral bus bar 124 (both shown in FIG. 1). In an alternative embodiment, first and second bus bars 400 and 402 are coupled to a power supply. In the exemplary embodiment, first and second bus bars 400 and 402 are positioned along top surface 222 of first insulating portion 202 between inner walls 228 and outer walls 230. Moreover, first and second bus bars 400 and 402 are coupled to first insulating portion 202 by inserting fastening mechanisms 238 through corresponding openings 404 formed in each of first and second bus bars 400 and 402.

Moreover, as shown in FIG. 6, a third bus bar 406 and a fourth bus bar 408 are coupled to first insulating portion 202 and second insulating portion 204. Specifically, third and fourth bus bars 406 and 408 are positioned along at least a portion of top surface 258 of second insulating portion 204. In addition, third and fourth bus bars 406 and 408 extend across opening 268 defined between first insulating portion 202 and second insulating portion 204. Moreover, a portion of third and fourth bus bars 406 and 408 are positioned in electrical contact along a portion of a top surface of first and second bus bars 400 and 402, respectively, to pass current to first and second bus bars 400 and 402. Third bus bar 406 and/or fourth bus bar 408 are coupled to second insulating portion 204 by inserting posts 256 through a respective aperture 410 that extends through third bus bar 406 and/or fourth bus bar 408. Similarly, a fifth bus bar 412 and a sixth bus bar 414 are coupled to second insulating portion 204. Specifically, fifth and sixth bus bars 412 and 414 are positioned along top surface 258 of second insulating portion 204. Fifth and sixth bus bars 412 and 414 also extend at least partially across opening 268. Fifth bus bar 412 and/or sixth bus bar 414 are coupled to second insulating portion 204 by inserting posts 256 through a respective aperture 416 that extends through fifth bus bar 412 and/or sixth bus bar 414.

As shown in FIG. 7, bottom portion 302 of element 300 is positioned between at least a portion of one or more bus bars, such as third and fifth bus bars 406 and 412, and enclosure 102 to facilitate conducting heat from bus bars 406 and 412 and/or a circuit breaker to enclosure 102. More specifically, bottom portion 302 is sized to be inserted into opening 268 such that top surface 306 (shown in FIG. 5) of bottom portion 302 is directly in contact with at least a portion of a bottom surface of third and fifth bus bars 406 and 412. In addition, bottom surface 308 (shown in FIG. 5) of bottom portion 302 is positioned directly in contact with an interior surface (not shown) of enclosure 102. In some embodiments, a thermal paste or resilient surface coating is applied to bottom surface 308 and/or the interior surface of enclosure 102 to enhance heat transfer. As shown in FIG. 8, top portion 304 of element 300 is positioned above bottom portion 302 and at least a portion of third bus bar 406. More specifically, bottom surface 312 (shown in FIG. 4) of top portion 304 is positioned along at least a portion of top surface 306 and along at least a portion of a top surface of third bus bar 406. In addition, at least a portion of third bus bar 406 is enclosed in a groove (not shown in FIGS. 6-8) that is formed in element 300. In some embodiments, a thermal paste or resilient surface coating is applied to bottom surface 312 and/or top surface 306 to enhance heat transfer.

Referring to FIGS. 6-8, and in the exemplary embodiment, fifth and sixth bus bars 412 and 414 are configured to conduct power to a circuit breaker (not shown in FIGS. 6-8), and third and fourth bus bars 406 and 408 are configured to conduct power to a load (not shown). Third and fifth bus bars 406 and 412 each include a plurality of extensions 418 that extend upward from a main body 420 to connect to the circuit breaker. Similarly, fourth and sixth bus bars 408 and 414 each include a plurality of projections 422 that extend upward from a main body 420. Moreover, projections 422 extend outward over opening 268 and are configured to connect to the circuit breaker via respective apertures 424.

Figure 9:
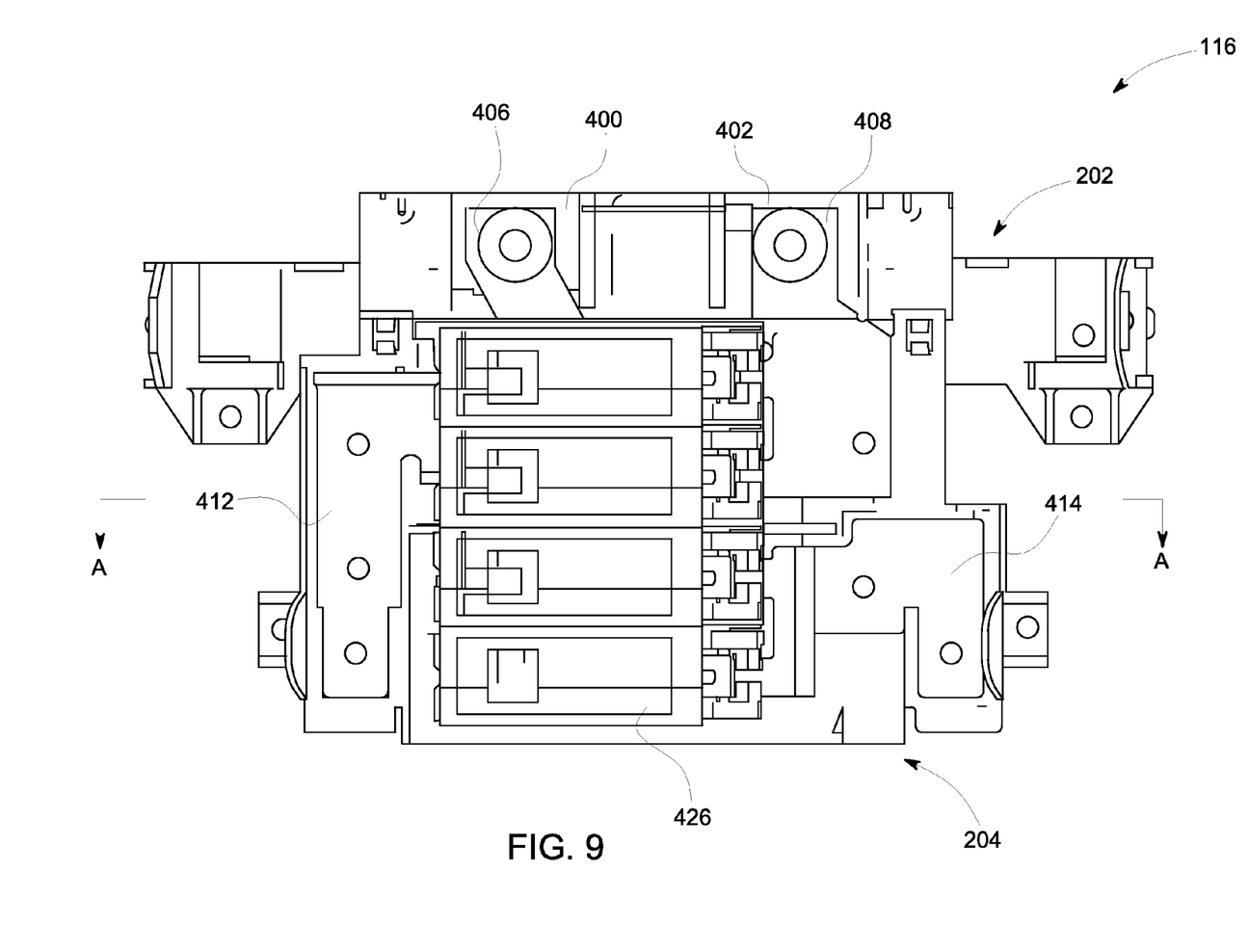
FIG. 9 is a top view of the circuit breaker assembly shown in FIG. 6.
Figure 10:
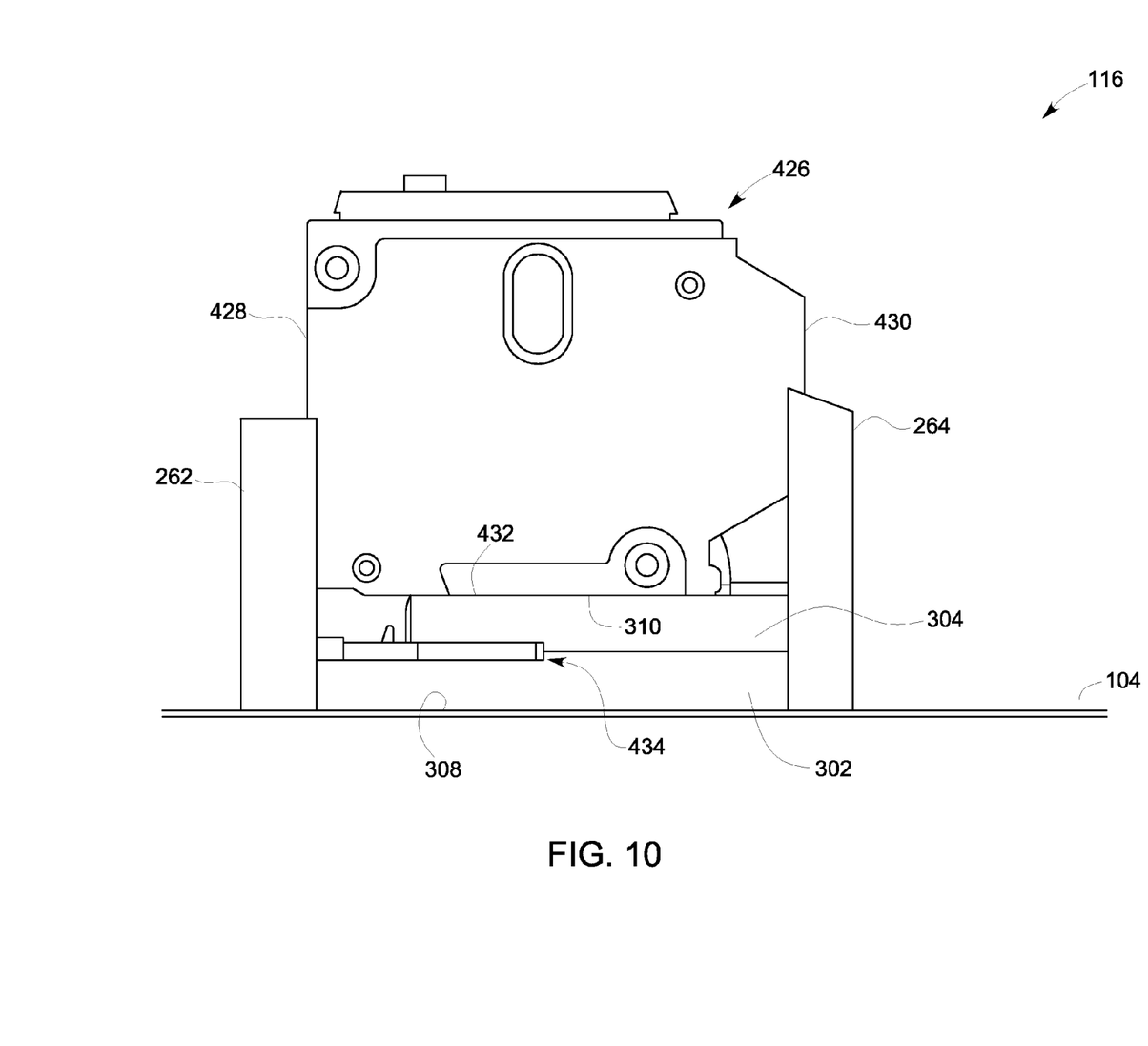
FIG. 10 is a side view of the circuit breaker assembly shown in FIG. 6.

FIG. 9 is a top view of circuit breaker assembly 116, and FIG. 10 is a side view of circuit breaker assembly 116 along the line A-A. As shown in FIG. 9, a circuit breaker 426 is coupled to a plurality of bus bars for conducting power to a load (not shown). For example, fifth and sixth bus bars 412 and 414 receive power from first and second bus bars 400 and 402 (shown in FIGS. 6-8), and conduct the power to the load via circuit breaker 426 and third and fourth bus bars 406 and 408. In the exemplary embodiment, circuit breaker 426 is a multi-pole circuit breaker, such as a four-pole circuit breaker. However, any suitable circuit breaker or circuit interruption device may be used that provides circuit monitoring and/or circuit interruption abilities described herein. During operation, circuit breaker 426 monitors a respective circuit conductor that is coupled to circuit breaker assembly 116 for a fault, such as an overcurrent fault. Once a fault is detected in a circuit conductor, circuit breaker 426 interrupts the circuit. For example, mechanically-stored energy, such as a spring, is used to separate contacts.

As shown in FIG. 10, a bottom surface 432 of circuit breaker 426 is positioned in direct contact with top surface 310 (shown in FIG. 4) of element top portion 304. In an alternative embodiment, a thermal paste or resilient surface coating is applied to top surface 310 and/or a interior surface of circuit breaker 426 to enhance heat transfer. Moreover, circuit breaker 426 is positioned between projections 262 and 264 such that a first side surface 428 of circuit breaker 426 is directly in contact with first projection 262 and a second side surface 430 of circuit breaker 426 is directly in contact with second projection 264. Projections 262 and 264 provide electrical isolation between circuit breaker 426 and other conductive elements within electrical panel 100 (shown in FIG. 1). As described above, third bus bar 406 is sized to extend at least partially into a groove 434 formed between bottom portion 302 of element 300 and top portion 304 of element 300. Moreover, as shown in FIG. 10, a heat path is provided that facilitates transferring heat from circuit breaker 426 and/or bus bars 400, 402, 406, 408, 412, and/or 414 to enclosure via element 300 to increase a temperature of enclosure 102 in order to decrease an operating temperature of circuit breaker 426. For example, heat generated by circuit breaker 426 is transferred to enclosure 102 via element 300. In addition, heat generated by bus bars 400, 402, 406, 408, 412, and/or 414 is transferred to enclosure 102 via element 300. Furthermore, element 300 provides electrical isolation between circuit breaker 426 and enclosure 102, and between bus bars 400, 402, 406, 408, 412, and/or 414 and enclosure 102 to protect users from shock and/or to prevent equipment damage.

Exemplary embodiments of systems and apparatus for dissipating heat from an electrical panel are described above in detail. The systems and apparatus are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

Although the present invention is described in connection with exemplary power distribution equipment, embodiments of the invention are operational with numerous other general purpose or special purpose power distribution equipment or configurations. The power distribution equipment is not intended to suggest any limitation as to the scope of use or functionality of any aspect of the invention. Moreover, the power distribution equipment should not be interpreted as having any dependency or requirement relating to any one or combination of components illustrated in the exemplary operating environment.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electrical device comprising:
an enclosure comprising an interior surface; and
at least one bus bar; and
an element enclosing at least a portion of said at least one bus bar, said element comprising a first surface contacting said interior surface and configured to transfer heat from said at least one bus bar to said enclosure and configured to provide electrical isolation between said enclosure and said at least one bus bar, said element further comprising a first portion comprising a top surface and positioned between said at least one bus bar and said interior surface and a second portion at least partially positioned along said top surface.

2. An electrical device in accordance with claim 1, wherein said second portion comprises a bottom surface, said first portion top surface and said second portion bottom surface defining a groove therebetween, at least a portion of said at least one bus bar positioned within said groove.

3. An electrical device in accordance with claim 1, wherein said second portion is at least positioned partially along said top surface with a thermal paste therebetween.

4. An electrical device in accordance with claim 1, wherein said element is unitary and comprises a groove extending into said element, at least a portion of said at least one bus bar positioned within said groove.

5. An electrical device in accordance with claim 1, further comprising a circuit breaker coupled to said at least one bus bar, said element further comprising a second surface, said circuit breaker positioned along at least a portion of said second surface.

6. An electrical device in accordance with claim 1, further comprising at least one insulating portion configured to be coupled to said enclosure, said at least one insulating portion defining a cutout portion that enables said element to be positioned in contact with said interior surface.

7. An electrical device in accordance with claim 1, further comprising a lug coupled to said at least one bus bar, said element further comprising a second surface, said lug positioned along at least a portion of said second surface.

8. A circuit breaker assembly for use with an electrical enclosure, said circuit breaker assembly comprising:
at least one bus bar;
a circuit breaker coupled to said at least one bus bar; and
an element enclosing at least a portion of said at least one bus bar, said element comprising a first surface and a second surface, said first surface contacting the electrical enclosure and said circuit breaker positioned along at least a portion of said second surface, said element configured to transfer heat from at least one of said at least one bus bar and said circuit breaker to the electrical enclosure and configured to provide electrical isolation between the electrical enclosure and said at least one bus bar, said element further comprising a first portion positioned between said at least one bus bar and the electrical enclosure, and a second portion positioned between said first portion and said circuit breaker.

9. A circuit breaker assembly in accordance with claim 8, wherein said first portion comprises a top surface and said second portion comprises a bottom surface, said first portion top surface and said second portion bottom surface defining a groove therebetween, at least a portion of said first bus bar positioned within said groove.

10. A circuit breaker assembly in accordance with claim 9, wherein said second portion is at least positioned partially along said top surface with a thermal paste therebetween.

11. A circuit breaker assembly in accordance with claim 8, wherein said element is unitary and comprises a groove extending into said element, at least a portion of said at least one bus bar positioned within said groove.

12. A circuit breaker assembly in accordance with claim 8, further comprising a surface coating applied along at least a portion of at least one of said first surface and said second surface to enhance heat transfer from at least one of said at least one bus bar and said circuit breaker to the electrical enclosure.

13. A method of assembling a circuit breaker assembly for use within an electrical panel enclosure, the circuit breaker assembly including a circuit breaker configured to be connected to a conductor, said method comprising:
connecting at least one bus bar to the conductor;
positioning an element to enclose at least a portion of the at least one bus bar, and such that a first surface of the element is positioned in contact with the electrical panel enclosure to facilitate transferring heat from the at least one bus bar to the electrical panel enclosure and to facilitate providing electrical isolation between the electrical panel enclosure and the at least one bus bar; and
coupling the circuit breaker to the at least one bus bar along at least a portion of a second surface of the element, wherein the element includes a first portion and a second portion, said positioning an element comprises positioning the first portion positioned between the at least one bus bar and the interior surface, and positioning the second portion between the first portion and the circuit breaker.

14. A method in accordance with claim 13, wherein the first portion and the second portion define a groove therebetween, said positioning an element further comprises positioning the first portion and the second portion such that at least a portion of the at least one bus bar is positioned within the groove.

15. A method in accordance with claim 13, further comprising coupling at least one insulating portion to the enclosure and coupling the circuit breaker to the at least one insulating portion, wherein the at least one insulating portion defines a cutout portion that enables the element to be positioned in contact with the interior surface.

16. A method in accordance with claim 13 wherein the element is unitary and includes a groove formed therein, said positioning an element comprises positioning the element such that at least a portion of the at least one bus bar is positioned within the groove.

17. A method in accordance with claim 13, further comprising applying one of a thermal paste and surface coating to at least one of the first surface and the second surface to enhance heat transfer from at least one of the at least one bus bar and the circuit breaker to the equipment panel enclosure.

* * * * *